United States Patent
Zhang et al.

(10) Patent No.: US 6,661,913 B1
(45) Date of Patent: *Dec. 9, 2003

(54) SYSTEM AND METHOD FOR DETERMINING STRUCTURE AND MOTION USING MULTIPLES SETS OF IMAGES FROM DIFFERENT PROJECTION MODELS FOR OBJECT MODELING

(75) Inventors: Zhengyou Zhang, Redmond, WA (US); Padmanabhan Anandan, Issaquah, WA (US); Heung-Yeung Shum, Bellevue, WA (US)

(73) Assignee: Microsoft Corporation, Redmond, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/336,218

(22) Filed: Jun. 19, 1999

Related U.S. Application Data

(60) Provisional application No. 60/132,607, filed on May 5, 1999.

(51) Int. Cl.[7] .................................................. G06K 9/00
(52) U.S. Cl. ...................................... 382/154; 345/419
(58) Field of Search ................................ 382/103, 107, 382/154, 276; 345/419, 420, 584, 587, 619, 664, 418, 473

(56) References Cited

U.S. PATENT DOCUMENTS

| | | | | |
|---|---|---|---|---|
| 5,633,995 A | * | 5/1997 | McClain | 345/419 |
| 5,748,199 A | * | 5/1998 | Palm | 345/473 |
| 5,963,664 A | | 10/1999 | Kumar et al. | 382/154 |
| 6,137,902 A | * | 10/2000 | Kinoshita et al. | 382/154 |
| 6,175,648 B1 | * | 1/2001 | Ayache et al. | 382/154 |

OTHER PUBLICATIONS

Zhang Z. Determining the Epipolar Geometry and its Uncertainty: A Review. pp. 161–195 1997.

Xu G. and Zhang Z. Epipolar Geometry in Stereo, Motion and Object Recognition. Kluwer Academic Publishers. 1996.

Luong Q. and Faugeras O. The Fundamental Matrix: Theory, Algorithms, and Stability Analysis. International Journal of Computer Vision, 17, pp. 43–75, 1996.

Nash S. and Sofer A. Linear and Nonlinear Programming. 1996.

Shapiro L. Affine Analysis of Image Sequences. Cambridge University Press, pp. 1–210, 1995.

Hartley R. In Defence of the 8–point Algorithm. GE–Corporate Research and Development. pp. 1064–1070, 1995.

(List continued on next page.)

*Primary Examiner*—Samir Ahmed
*Assistant Examiner*—Vikkram Bali
(74) *Attorney, Agent, or Firm*—Lyon & Harr, LLP; Richard T. Lyn

(57) ABSTRACT

The present invention is embodied in systems and methods for determining structure and motion of a three-dimensional (3D) object using two-dimensional (2D) images of the object obtained from multiple sets of views with different projection models, such as from a full perspective view and a weak perspective views. A novel fundamental matrix is derived that embodies the epipolar geometry between a full perspective view and a weak perspective view. The systems and methods of the present invention preferably uses the derived fundamental matrix together with the 2D image information of the full and weak perspective views to digitally reconstruct the 3D object and produce results with multi-resolution processing techniques. These techniques include recovering and refining motion parameters and recovering and refining structure parameters of the fundamental matrix. The results can include, for example, 3D positions of points, camera position between different views, texture maps, and the like.

25 Claims, 13 Drawing Sheets

OTHER PUBLICATIONS

Huang T. and Netravali A. Motion and Structure from Feature Correspondences: A Review. Proceedings of the IEEE. vol. 82 No. 2, pp. 252–268, 1994.

Shashua A. Projective Structure from Uncalibrated Images: Structure frim Motion and Recognition. IEEE Trans. PAMI, vol. 16 No. 8, pp. 778–790, Aug. 1994.

Faugeras O. Three–Dimensional Computer Vision, The MIT Press, 1993.

Mohr R., Veillon F., and Quan L. Relative 3D Reconstruction Using Multiple Uncalibrated Images. pp. 543–548, 1993.

Haryley R., Gupta R., and Chang T. Stereo from Uncalibrated Cameras. GE–Corporate Research and Development. pp. 761–764, 1992.

Huang T.S. and Faugeras o. Some Properties of the E Matrix in Two–View Motion Estimation. IEEE Trans. PAMI, vol. 11, No. 12 pp. 1310–1312, Dec. 1989.

Aggarwal J.K. and Nandhakumar N. On the Computation of Motion from Sequences of Images—A Review. Proceedings Of the IEEE, vol. 75, pp. 917–935, No. 8, 1988.

Roach J. and Aggarwal J.K. Determining the Movement of Objects from a Sequence of Images. pp. 544–562, 1980.

Ullman S. The Interpretation of Visual Motion. The MIT Press. 1979.

Aloimonos J. Perspective approximations. vol. 8, No. 3 pp. 179–192.

Faugeras O. What can be seen in three dimensions with an uncalibrated stereo rig? pp. 563–578.

Golub G. and Van Loan C. Matrix Computation–Third Edition. The John Hopkins University Press.

Hartley R. Euclidean Reconstruction from Uncalibrated Views. pp. 237–257.

Maybank S. Theory of Reconstructure from Image Motion.

Spellucci P. A SQP Method for General Nonlinear Programs Using Equality Contrained Subproblems. Technical University at Darmstadt, Department of Mathematics. pp. 1–27.

* cited by examiner

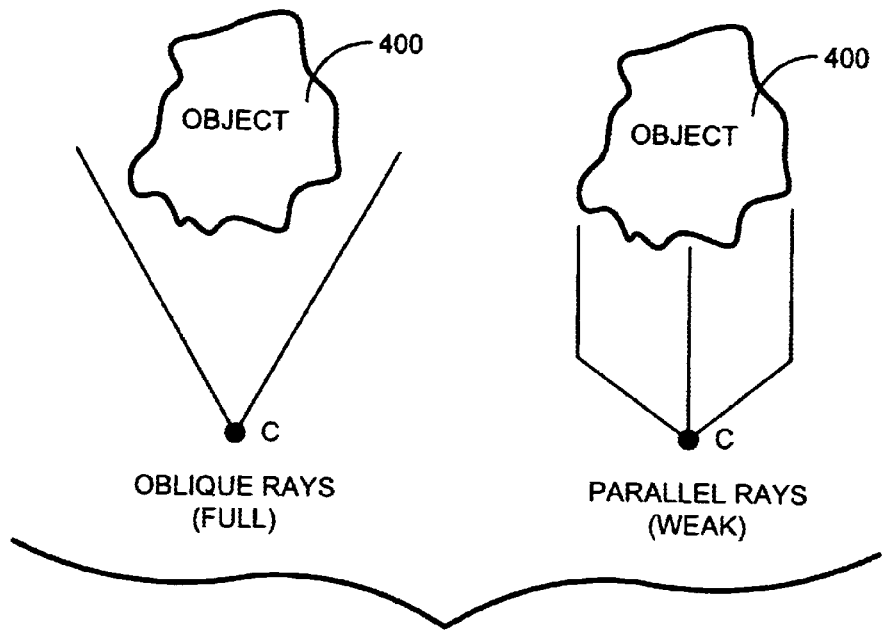
FIG. 4A
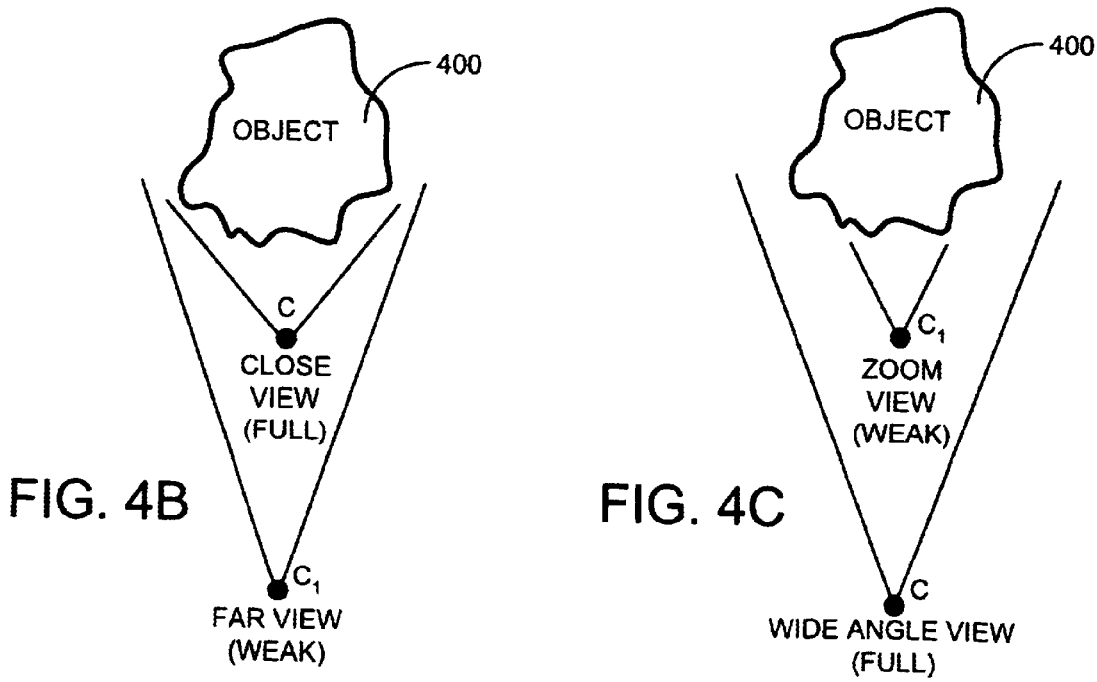
FIG. 4B
FIG. 4C

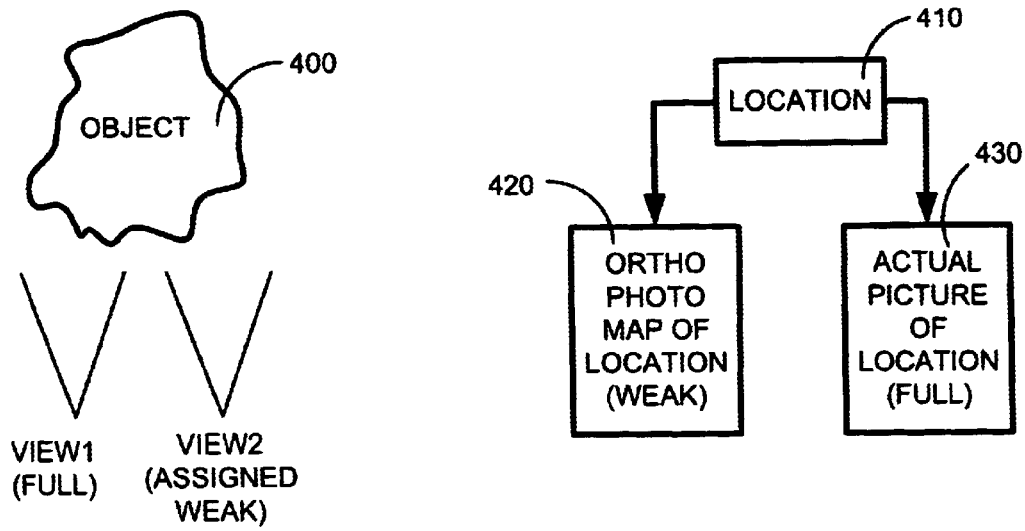
FIG. 4D
FIG. 4E
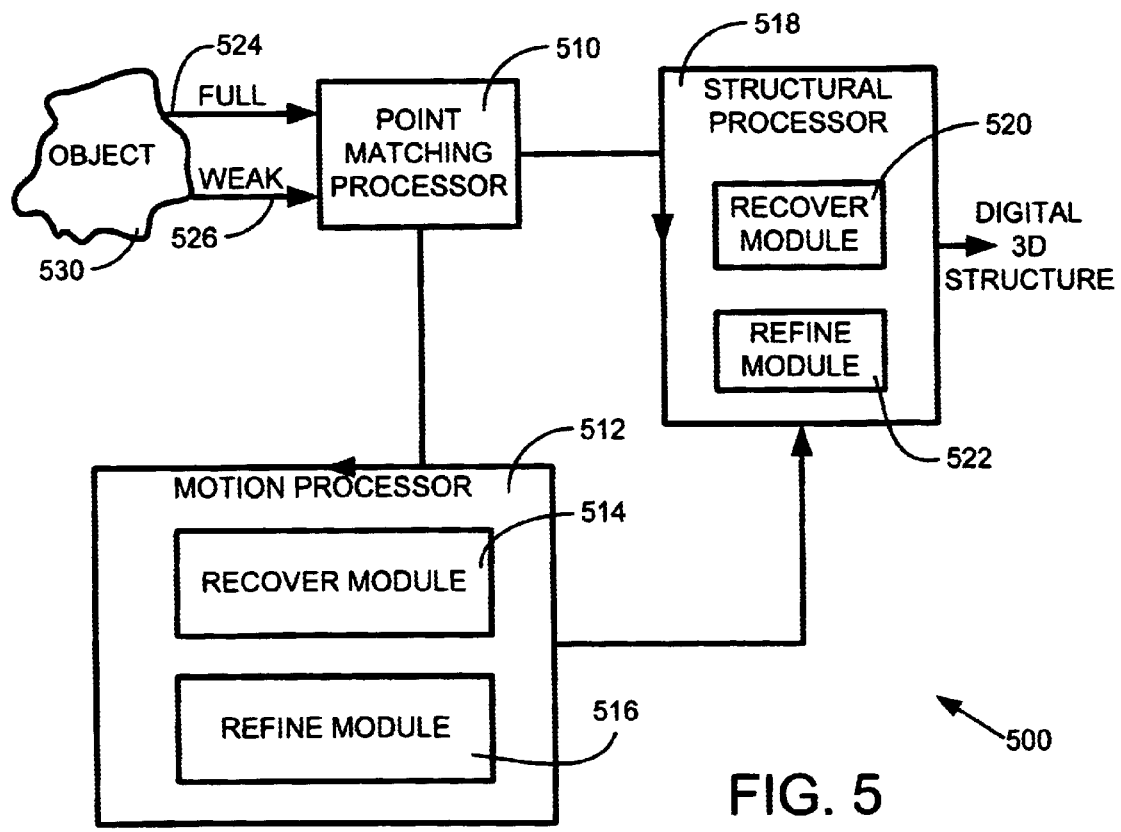
FIG. 5

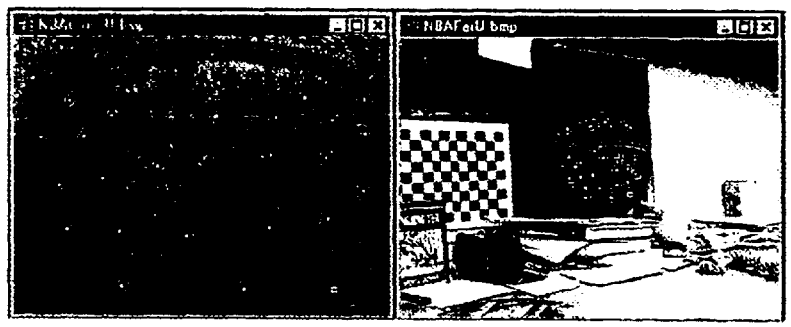
FIG. 13A
FIG. 13B
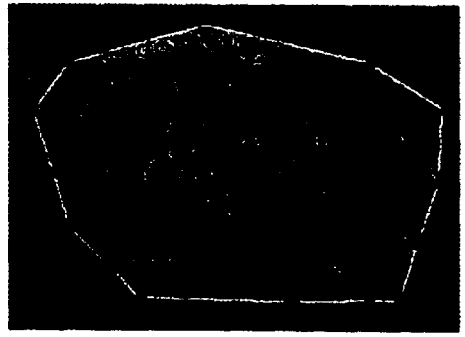
FIG. 14A
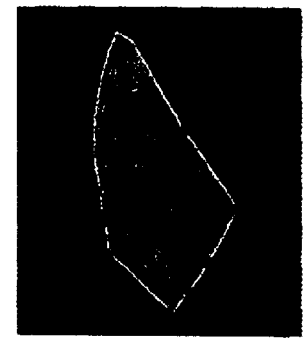
FIG. 14B

SYSTEM AND METHOD FOR DETERMINING STRUCTURE AND MOTION USING MULTIPLES SETS OF IMAGES FROM DIFFERENT PROJECTION MODELS FOR OBJECT MODELING

CROSS-REFERENCE TO RELATED APPLICATIONS

This application is based on Provisional Patent Application Serial No. 60/132,607 filed May 5, 1999, entitled "A MULTI-RESOLUTION OBJECT MODELING SYSTEM AND METHOD FOR DETERMINING STRUCTURE AND MOTION FROM TWO-DIMENSIONAL IMAGES", by Zhang et al.

BACKGROUND OF THE INVENTION

1. Field of the Invention

The present invention relates in general to object modeling, and in particular to a system and method for determining structure and motion from two-dimensional (2D) images for multi-resolution object modeling.

2. Related Art

In the computer vision field, it is very desirable to determine motion and structure from 2D images. One of the first methods to determine motion and structure and solve this problem involved assuming an orthographic camera projection model. Three views were necessary to recover the motion and structure from point correspondences with this method. A full perspective projection model was used, and thus two views were sufficient from point correspondences. After this method was introduced, other approaches have been proposed to solve the problem using either linear or nonlinear methods.

Recently, the use of uncalibrated images has been used. The main motivation to use linear projection models is in order to avoid the non-linearity of perspective projection and the numerical instabilities incurred during structure from motion (SFM) analysis that arise due to this non-linearity. When the field of view subtended by the object/scene of interest is small, the errors due to the linear approximation can be negligible. Thus, the approximation errors (potentially negligible) are traded off against the numerical instabilities (potentially severe for narrow field-of-view).

Although both full perspective and its linear approximation (affine, weak perspective and orthographic projection models) are used in structure from motion, currently they are only used separately. In other words, images are assumed to be obtained under the same projection model. Therefore, what is needed is an efficient system and method for determining structure and motion from two-dimensional (2D) images of different projection models for multi-resolution object modeling. What is also needed is a system and method that performs multi-resolution object modeling from different projection models that produces stable results.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention, in general, is embodied in systems and methods for determining structure and motion of an object using multiple sets of images from different projection models of the object for multi-resolution modeling of the object. In addition, the present invention is embodied in a method for deriving a novel fundamental matrix from multiple images of the object and using parameters of the fundamental matrix to digitally recover a model of the object.

Namely, two-dimensional (2D) images of a three-dimensional (3D) object are obtained from multiple sets of views with different projection models, such as from a full perspective view and a weak perspective views. The fundamental matrix embodies the epipolar geometry between a full perspective view and a weak perspective view. The systems and methods of the present invention preferably uses the derived fundamental matrix together with the 2D image information of the full and weak perspective views to digitally reconstruct the 3D object and produce results with multi-resolution processing techniques. These techniques include recovering and refining motion parameters and recovering and refining structure parameters. The results can include, for example, 3D positions of points, camera position between different views, texture maps, and the like.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout:

FIGS. 4A–4E illustrate some sample full and weak perspective vantage views which can be used for object modeling of the present invention;

FIG. 5 shows an operational and functional overview of one embodiment of the present invention;

FIGS. 13A–13B are pictures of sample images used in the working example and the results produced of the present invention; and FIGS. 14A–14B are pictures of the results for the working example of the present invention.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Introduction

The present invention determines structure from motion (SFM) of a 3D object from the combination of different projection models, such as from full and weak perspective 2D images. The present invention can be used in multi-resolution object modeling. As one example, multiple zoomed-in or close-up views can be combined with wider or distant reference views. The narrow field-of-view (FOV) images from the zoomed-in or distant views can be approximated as weak perspective projection. In contrast, previous SFM systems used images from the same projection model, such as either two (or more) perspective images or a set of weak perspective (more generally, affine) images. However, the use of-the perspective projection model often leads to instabilities during the estimation process due to non-linearities in the imaging model, and the use of the weak perspective model requires at least three images in order to obtain Euclidean structure.

Figure 12A:
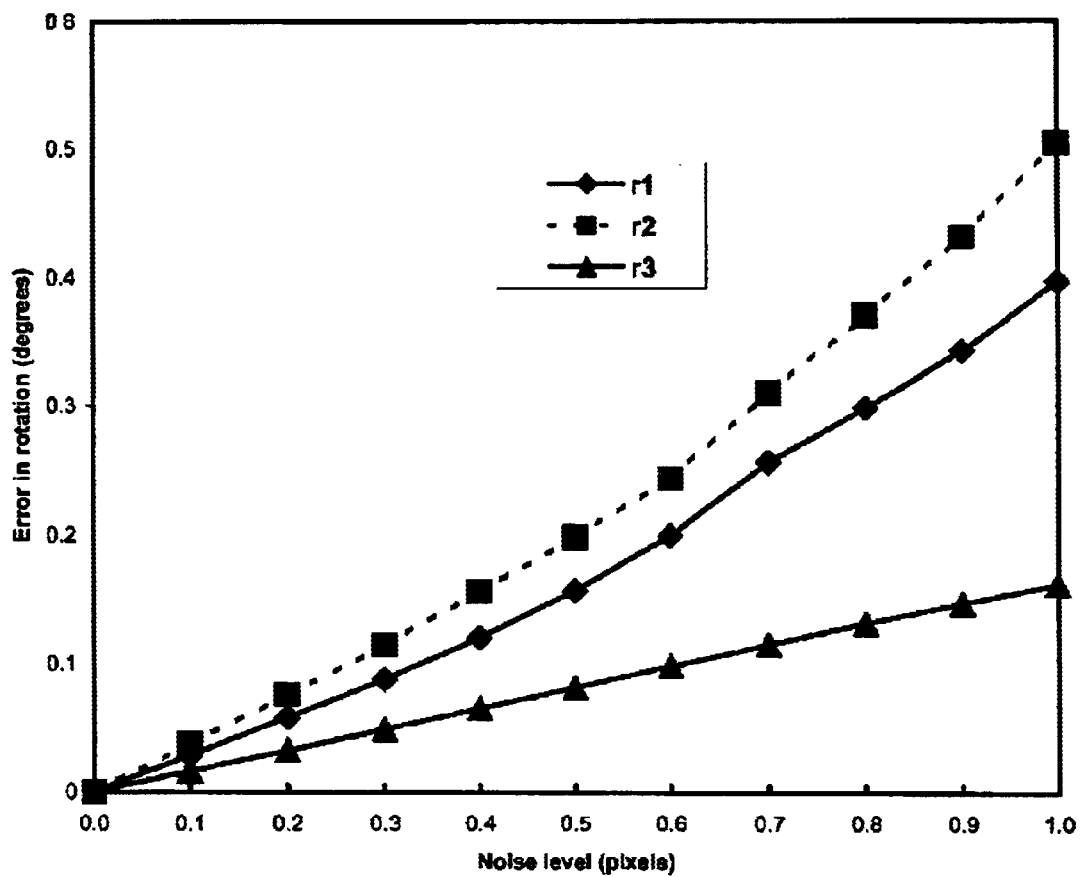
FIGS. 12A–12C are plot diagrams of the computer simulation working example illustrating relative errors.
Figure 12B:
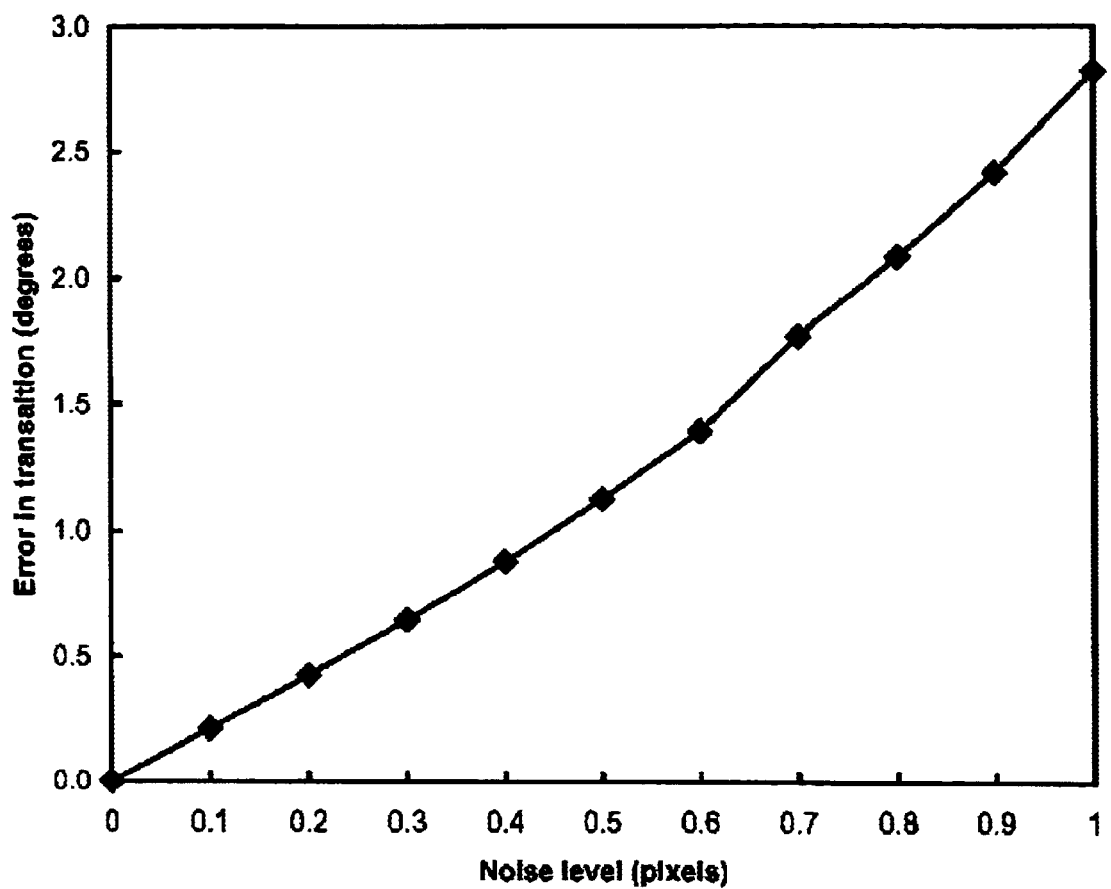
Figure 12C:
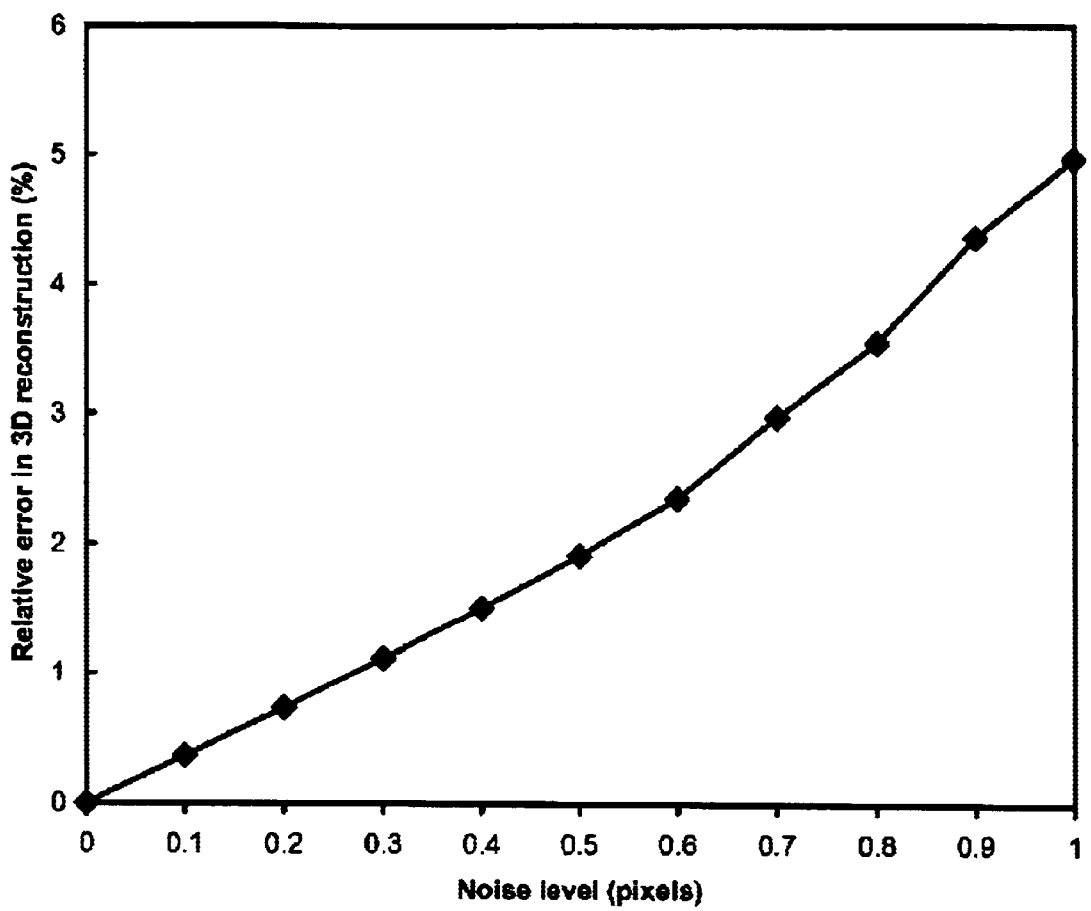

To solve this problem, the present invention is embodied in a SFM system and method utilizing different projection models. For example, one or more weak perspective view approximations can be fused with full perspective images. With this arrangement, although a relatively small amount of modeling inaccuracies are introduced, stable estimations and results are efficiently produced. Also, in contrast to the previous method which used a pair of weak perspective images, the system of the present invention has adequate information to recover Euclidean structure from a single perspective and a single weak perspective image. Further, the epipolar geometry of the present invention is simple and leads to more simpler and stable estimations, as compared to previous methods which used two perspective images. As shown in FIGS. 12A–12C and the accompanying discussion below, computer simulations show that more stable results can be obtained with the technique of the present invention, namely different projection models, as compared to the previous system which used the same projection model.

Exemplary Operating Environment

Figure 1:
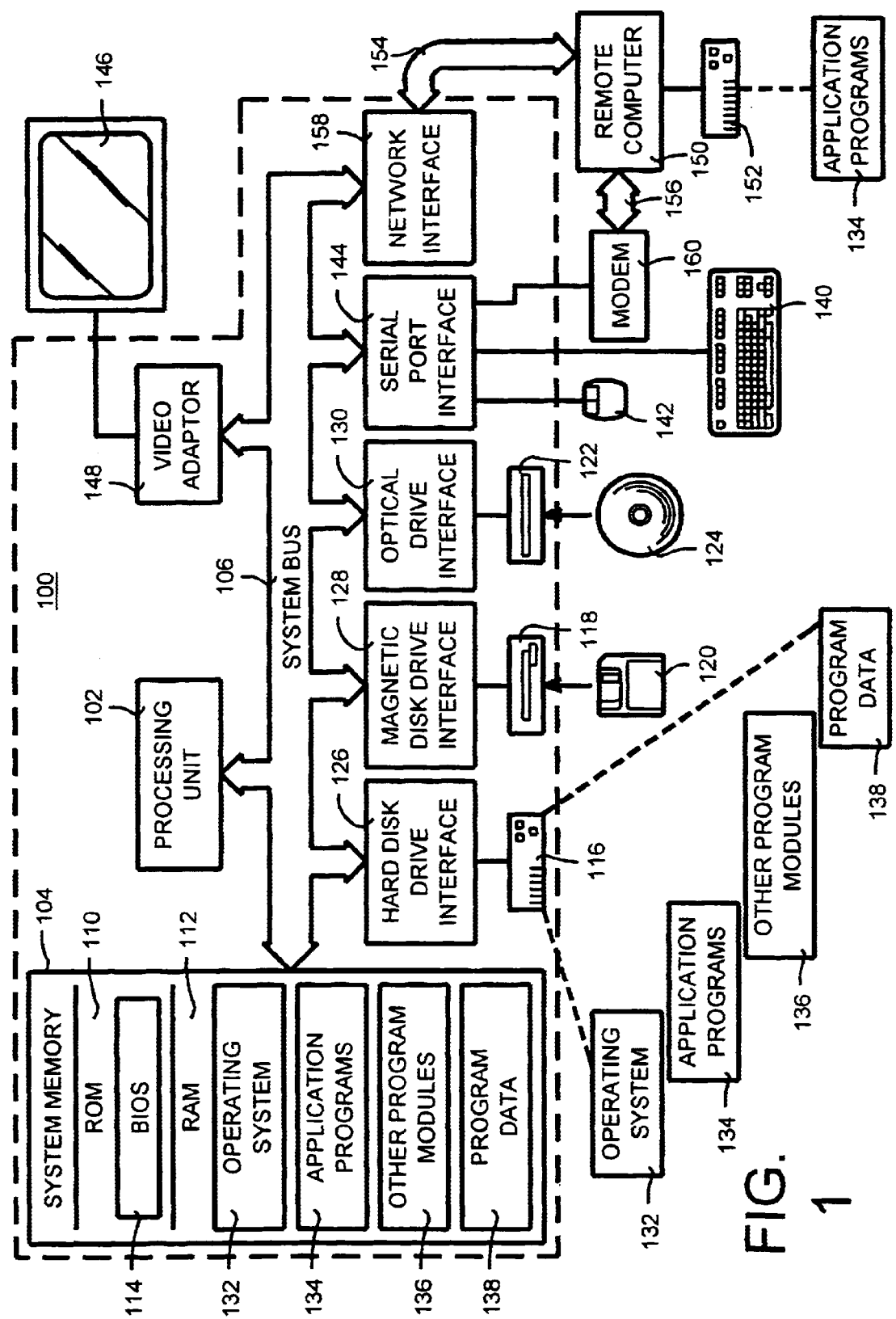
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general purpose computing device in the form of a conventional computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes computer storage media in the form of read only memory (ROM) 110 and random access memory (RAM) 112. A basic input/output system 114 (BIOS), containing the basic routines that helps to transfer information between elements within computer 100, such as during start-up, is stored in ROM 110. The computer 100 may include a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122-are connected to the system bus 106 by a hard disk drive interface 126, a magnetic disk drive interface 128, and an optical drive interface 130, respectively. The drives and their associated computer-readable media provide storage of computer readable instructions, data structures, program modules and other data for the computer 100. Although the exemplary environment described herein employs a hard disk, a removable magnetic disk 120 and a removable optical disk 130, it should be appreciated by those skilled in the art that other types of computer readable media can store data that is accessible by a computer. Such computer readable media can be any available media that can be accessed by computer 100. By way of example, and not limitation, such computer readable media may comprise communication media and computer storage media. Communication media typically embodies computer readable instructions, data structures, program modules or other data in a modulated data signal such as a carrier wave or other transport mechanism and includes any information delivery media. The term "modulated data signal" means a signal that has one or more of its characteristics set of changed in such a manner as to encode information in the signal. By way of example, and not limitation, communication media includes wired media such as wired network or direct wired connection, and wireless media such as acoustic, RF, infrared and other wireless media. By way of example, and not limitation, communication media includes wired media such as a wired network or direct wired connection, and wireless media such as acoustic, RF, infrared and other wireless media. Computer storage media includes any method or technology for the storage of information such as computer readable instructions, data structures, program modules or other data. By way of example, such storage media includes RAM, ROM, EPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can be accessed by computer 100. Combinations of any of the above should also be included within the scope of computer readable media.

A number of program modules may be stored on the hard disk, magnetic disk 120, optical disk 124, ROM 110 or RAM 112, including an operating system 132, one or more application programs 134, other program modules 136, and program data 138. A user may enter commands and information into the computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, computers may also include other peripheral output devices (not shown), such as speakers and printers.

The computer 100 may operate in a networked environment using logical connections to one or more remote computers, such as a remote computer 150. The remote computer 150 may be a personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the computer 100 is connected to the local network 154 through a network interface or adapter 158. When used in a WAN networking environment, the computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the computer 100, or portions thereof, may be stored in the remote memory storage device. It will be appreciated that the network connections shown are exemplary and other means of establishing a communications link between the computers may be used.

General Overview

Figure 2:
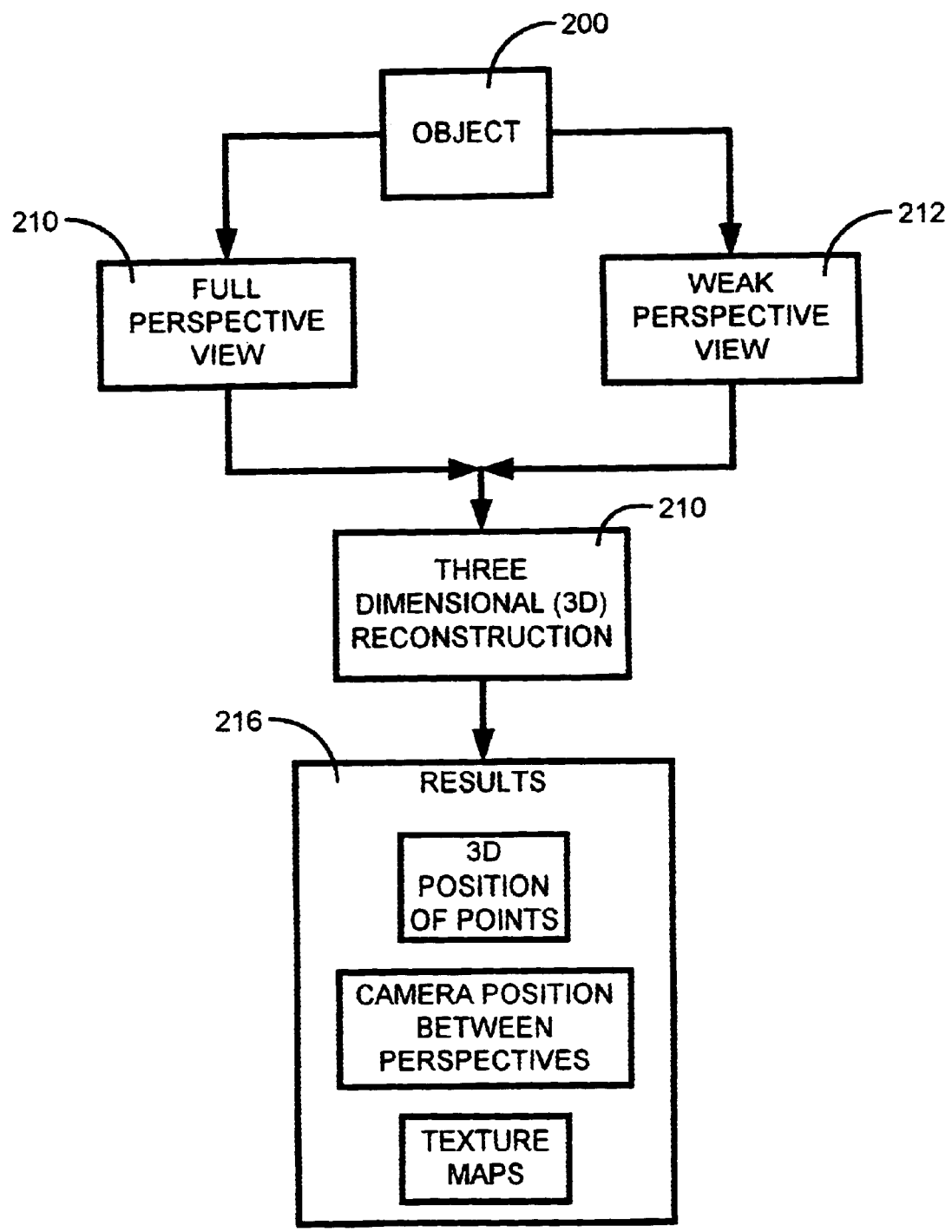
FIG. 2 is an overview block diagram of the present invention.

FIG. 2 is an overview block diagram of the present invention. The present invention is embodied in systems and methods for determining structure and motion of an object from two-dimensional (2D) images of the object for multi-resolution digital modeling of the object. In general, 2D images of a three-dimensional (3D) object 200 are obtained from multiple views of preferably different projection models.

Namely, at least one full perspective view and at least one weak perspective view are obtained as the 2D images, for example, with an analog or digital camera. Digital information 210, 212 representing the object is extracted from the full and weak perspective views, respectively. Next, the information 210, 212 representing the multiple views of the images is combined to digitally reconstruct the object 214. In addition, results of the combination are produced 216. The results can include, for example, 3D positions of points, camera position between perspectives, texture maps, and the like.

Figure 3:
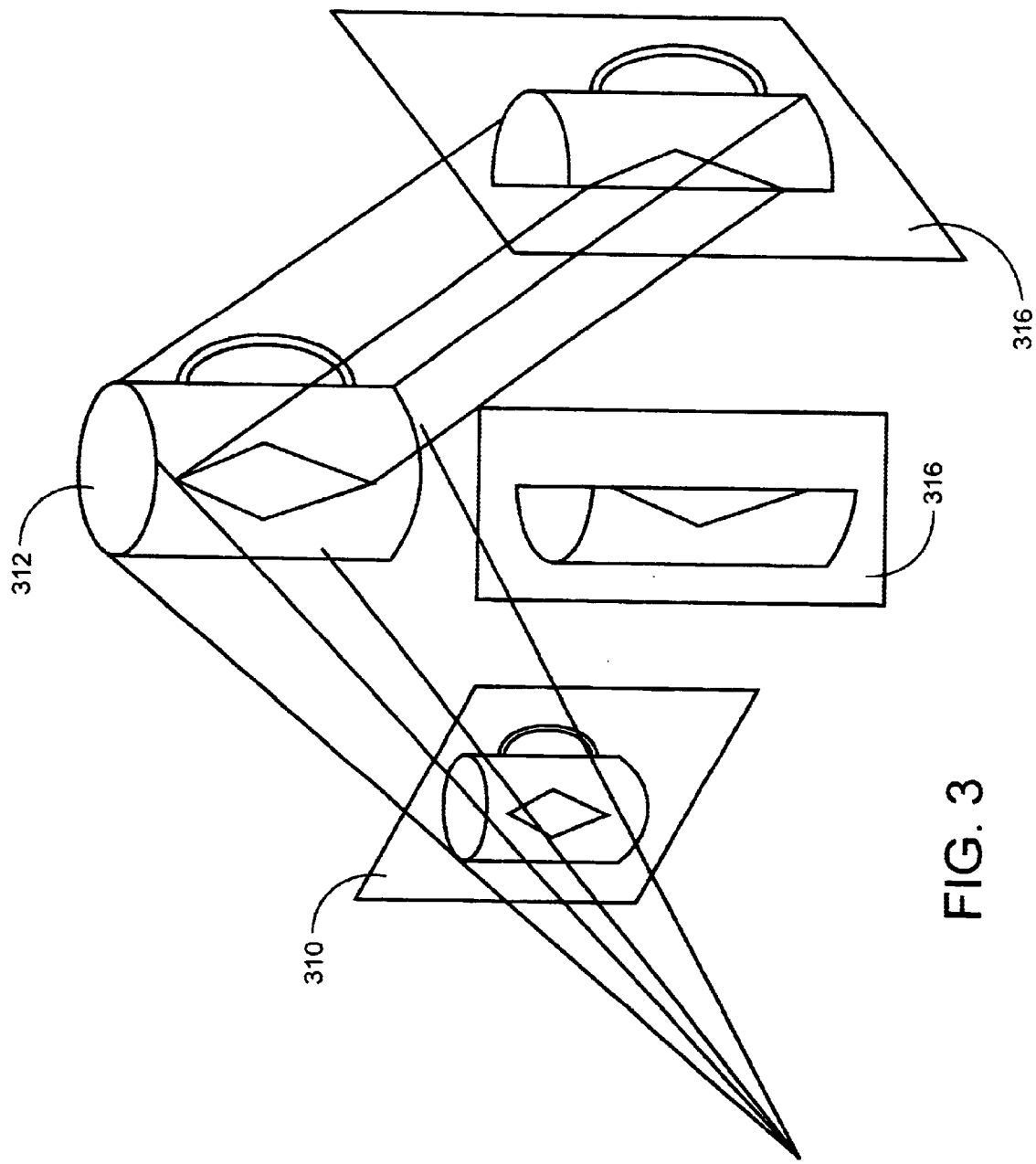
FIG. 3 illustrates the use of a full perspective view and multiple weak perspective views for object modeling in accordance with the present invention.

In the present invention, the full perspective view is preferably from a different projection model than the weak perspective view. As such, the present invention can be used in several scenarios with combinations of full perspective and weak perspective views for producing efficient and stable object modeling. For example, FIG. 3 illustrates the use of a full perspective view and multiple weak perspective views for object modeling in accordance with the present invention. Namely, a wide field-of-view (FOV) camera can be used to obtain a global perspective view 310 of the object or scene 312. A narrow FOV camera can be used to obtain several narrow FOV images 314, 316 by zooming (weak perspective) into different portions of the object/scene 312 in order capture the details.

Sample Configurations

FIGS. 4A–4E illustrate some sample full and weak perspective vantage views which can be used for object modeling of the present invention. Each set of full and weak information is combined for digitally reconstructing the 3D object and producing the above mentioned results. Namely, FIG. 4A shows one view of an object 400 obtained from point A, such as with a specialized camera, having oblique rays and another view of the same object obtained from point A1, such as with a standard camera, having parallel rays. The view having the oblique rays is considered the full perspective information and the view with the parallel rays is considered the weak perspective information.

FIG. 4B shows one view of an object obtained from point B at close range and another view of the same object obtained from point B1 at a far or remote view. The view obtained at close range is considered the full perspective information and the view obtained at a far view is considered the weak perspective information. FIG. 4C shows one view of an object obtained from point C with a wide angle view of the object and another view of the same object obtained from point C1 with a zoom view of the object. The view obtained with the wide angle is considered the full perspective information and the zoom view is considered the weak perspective information. FIG. 4D shows two similar views, view1 and view2, of an object obtained from similar vantage points. However, view1 is arbitrarily assigned to produce full perspective information, and view2 is assigned to produce weak perspective information. We then refine view2 in an iterative way to approach to full perspective projection.

FIG. 4E is applicable for locational maps. Namely, FIG. 4E shows one view of a location 410 depicted by an orthophoto or a map 420 of the location 410 and another view of the same location 410 depicted by an actual photograph 430 or picture of the location 410. The actual photograph or picture 430 is considered the full perspective information and the orthophoto or the map 420 is considered the weak perspective information. In each example, after the full perspective information and weak perspective information of the three-dimensional (3D) object are obtained, the respective information is combined, fused and processed to digitally reconstruct the 3D object and produce the results mentioned above, in accordance with the present invention.

Components and Operation

Structural Overview:

FIG. 5 shows a structural overview of the present invention. In general, the object modeling system 500 includes a point matching processor 510, a motion processor 512 having motion recover and refine modules 514, 516, and a structure processor 518 having structure recover and refine modules 520, 522.

The point matching processor 510 receives digital information 524, 526 representing full and weak perspective images (such as 2D images from vantage views discussed above in FIGS. 2–4) of multiple views of an object 530, such as a 3D object. The point matching processor 510 uses the digital information representing the full and weak perspective images to obtain point correspondences of the multiple views. There are several well known techniques for point matching. For example, one point matching technique includes identifying features, such as pairs of points, of the different views and matching the features between the views.

The motion processor 512 and the structure processor 518 use the point correspondences and other data (such as estimated and/or assumed motion and structure parameters that are discussed in detail-below) to model the 3D object 530. Namely, the motion recover and refine modules 514, 516 recover and refine predetermined motion parameters, such as the rotation between the multiple views and position vectors of the weak perspective view or views. The structure recover and refine modules 520, 522 recover and refine predetermined structure parameters for digitally generating a final 3D structure that models the original 3D object.

Figure 6:
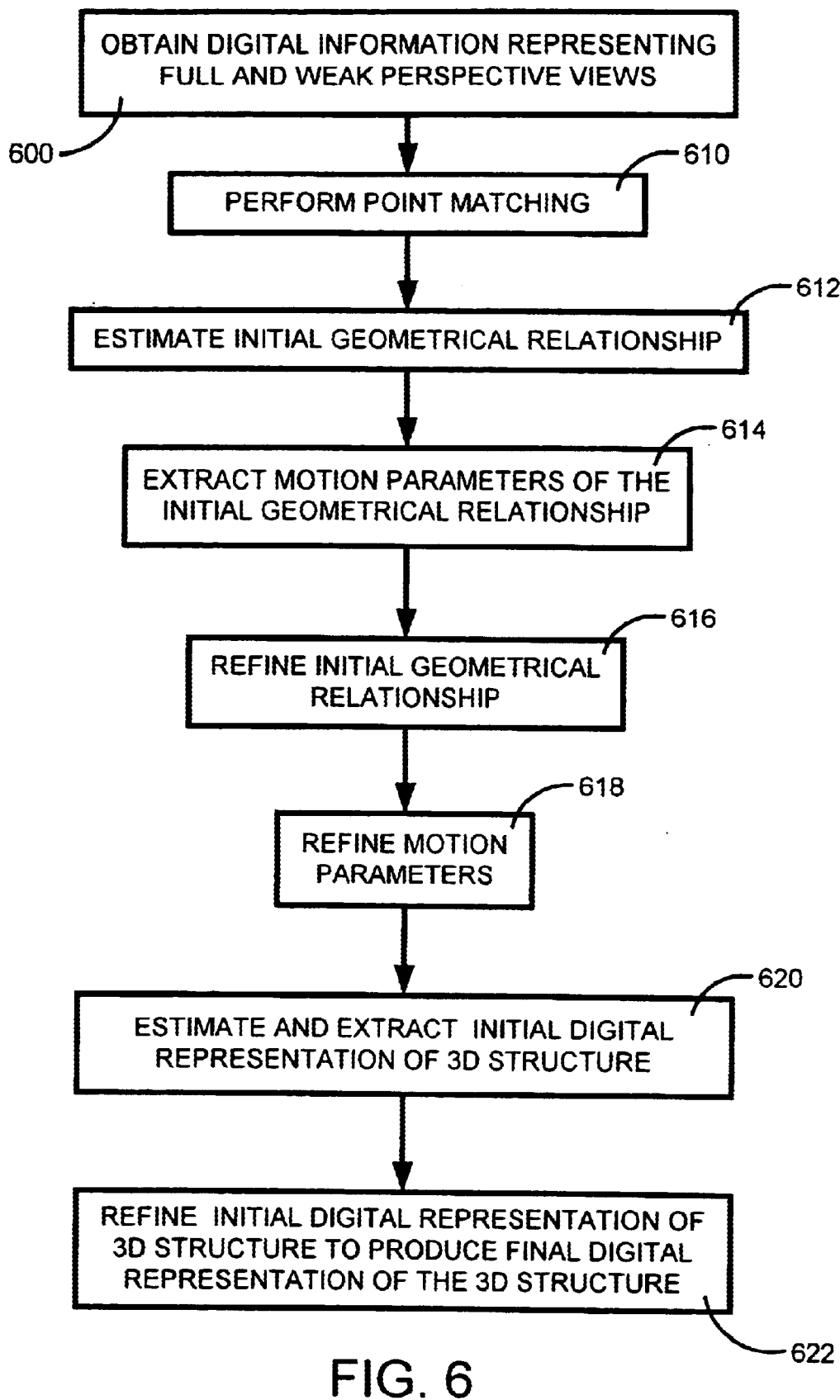
FIG. 6 is a flow/block diagram illustrating details of one embodiment of the present invention for recovering and refining motion and structure of the 3D object.

Operational Overview:

FIG. 6 is a flow/block diagram illustrating details of one embodiment of the present invention for recovering and refining motion and structure of the 3D object. Digital information representing a full perspective view and at least one weak perspective view is obtained (step 600). This can be accomplished by digitizing a 2D image of the respective views. Point matching is performed, such as identifying features of the different views and matching them between the views, for obtaining point correspondences of the views (step 610).

Next, a geometrical relationship representing the epipolar geometry of the full and weak perspective views is mathematically estimated or arbitrarily assumed as an initial geometrical relationship (step 612). As an option, the initial geometrical relationship can be refined by minimizing the distance between the initial geometrical relationship and a defined geometrical relationship (step 614). Preselected motion parameters of the initial geometrical relationship or refined geometrical relationship are then mathematically extracted or can be arbitrarily assumed as initial motion parameters (step 616). The initial motion parameters are then refined by minimizing the distance between the initial motion parameters and defined motion parameters (step 618).

The refined motion parameters can then be used to mathematically estimate and extract an initial digital representation of the 3D structure (step 620). Alternatively, an initial digital representation of the 3D structure can be arbitrarily assumed. Next, the initial digital representation of the 3D structure is refined by minimizing the distance between the initial digital representation of the 3D structure and a re-projection of 3D reconstruction of the object to produce final results (step 622). The final results can include, for example, a final digitally generated 3D structure, 3D positions of points, camera position between perspectives, texture maps, and the like.

Epipolar Geometry

In particular, the epipolar geometry of the full and weak perspective information discussed above can be used to produce a novel mathematical arrangement or matrix, derived below. Specifically, in object modeling systems, a camera is typically modeled as a pinhole, i.e., an image point $p=[x;y]^T$ and its corresponding space point $M=[X, Y, Z]^T$ are related by perspective projection: $x=X/Z, y=Y/Z$. If the field of view of the camera is small and the depth variation of an object is small compared with the distance between the object and the camera, then the perspective projection can be well approximated by an orthographic projection to an auxiliary plane, followed by a scaling, known as weak perspective projection. The relationship between an image point p and its corresponding space point M is given by: $x=X/Z_0, y=Y/Z_0$, where $Z_0$ is the average depth of the object. Note that $Z_0$ is an unknown parameter in the structure from motion problem (SFM).

In the present invention, multiple views (for example, 2D images) are obtained from different projection models, namely, one can be obtained from a full perspective projection and the other from a weak perspective projection. Without loss of generality, it is assumed that the world coordinate system coincides with the coordinate system of the perspective view. Further, it is assumed that the transformation between the full perspective and the weak perspective view is described by rotation R and translation $t=[t_1, t_2, t_3]^T$. Quantities related to the weak perspective view are indicated by a prime (') symbol. From this, the following equations are produced:

$$s\begin{bmatrix}x\\y\\1\end{bmatrix}=\begin{bmatrix}1&0&0&0\\0&1&0&0\\0&0&1&0\end{bmatrix}\begin{bmatrix}X\\Y\\Z\\1\end{bmatrix} \quad (1)$$

$$s'\begin{bmatrix}x'\\y'\\1\end{bmatrix}=\begin{bmatrix}R_{11}&R_{12}&R_{13}&t_1\\R_{21}&R_{22}&R_{23}&t_2\\0&0&0&w\end{bmatrix}\begin{bmatrix}X\\Y\\Z\\1\end{bmatrix} \quad (2)$$

where $R_{ij}$ is the (i, j) element of the rotation matrix, and $w=Z_0$ is the average depth or the scale factor. More compactly, this expression can be written in matrix form as:

$$s\tilde{p}=[I\ 0]\tilde{M}\ \text{and}\ s'\tilde{p}'=\begin{bmatrix}r_1^T&t_1\\r_2^T&t_2\\0^T&w\end{bmatrix}\tilde{M}$$

where $r_1^T$ is the $i^{th}$ row vector of the rotation matrix. In the following description, $w=[t_1, t_2, w]^T$ will be used. After eliminating s, s', and M, the following epipolar equation can be obtained:

$$\tilde{p}'^T G \tilde{p}=0 \quad (3)$$

where $$G=\begin{bmatrix}t_1\\t_2\\w\end{bmatrix}_x\begin{bmatrix}r_1^T\\r_2^T\\0^T\end{bmatrix}=\begin{bmatrix}-wr_2^T\\wr_1^T\\t_1r_2^T-t_2r_1^T\end{bmatrix}$$

In the above, $[x]_x$ denotes the antisymmetric matrix defined by vector x. Any pair of points (p, p') satisfies equation (3) if they correspond to a real space point. The above derived matrix is a novel fundamental matrix, referred to hereinafter as the G Matrix, but has some special properties which will be described below. It should be noted that $t_3$ does not appear in equation (3), and is not recovered from image information. This, however, does not affect the recovery of the Euclidean structure, as will be described below, due to the full perspective view.

Figure 7A:
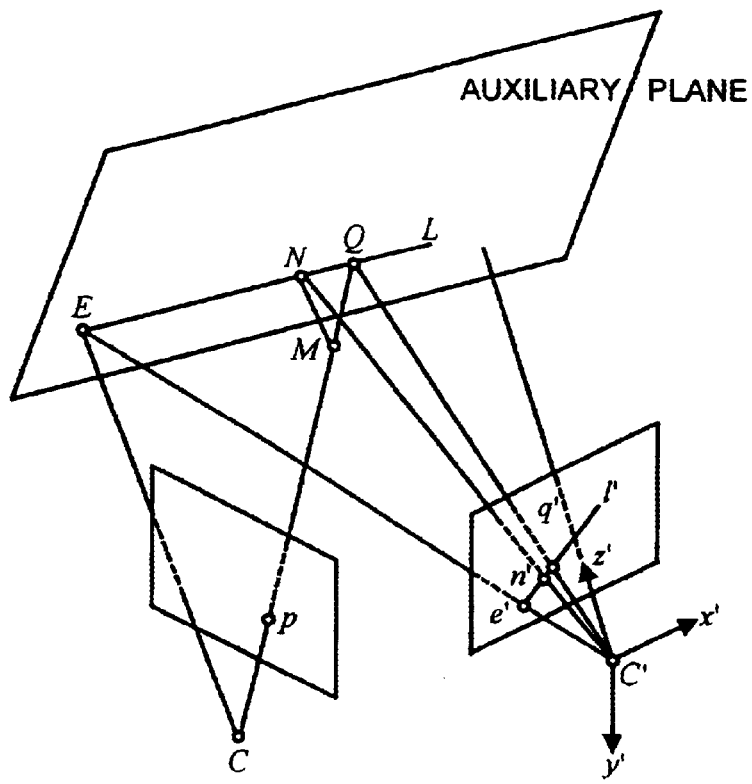
FIGS. 7A and 7B illustrate the epipolar geometry of the multiple views of the present invention.
Figure 7B:
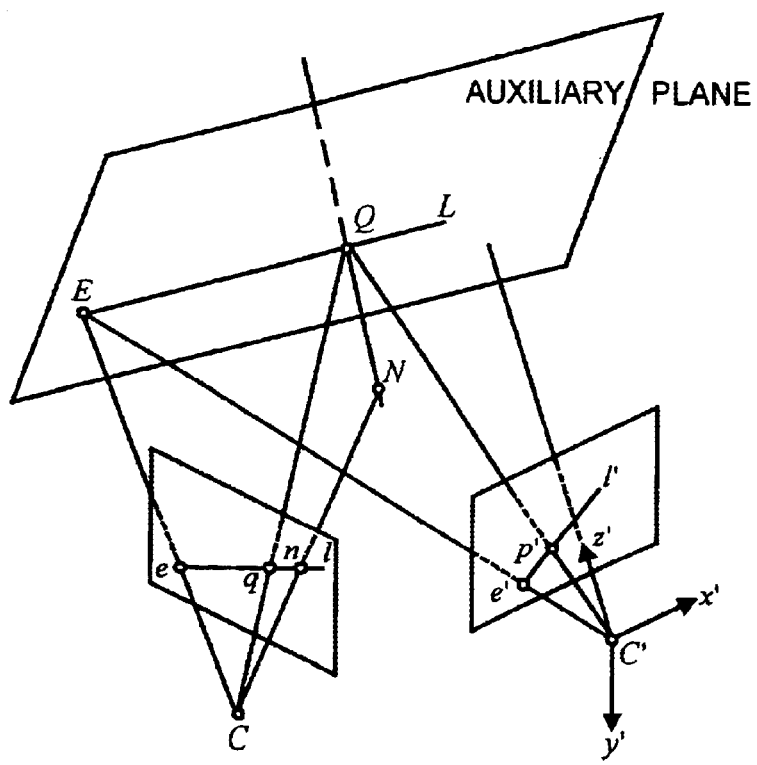

FIGS. 7A and 7B illustrate the epipolar geometry of the multiple views used for the object modeling system and method of the present invention. Referring to FIG. 7A, the epipolar geometry from a perspective view to a weak perspective view is shown. First, C and C' depict optical centers of two given cameras. For a given point p in the perspective image, its corresponding space point is on the semi-line CQ. A point taken on that line, such as M, first projects orthographically on the auxiliary plane at N, which in turn projects in the second image at n'. The locus on the auxiliary plane of orthographic projection of all points on the semi-line CQ is the semi-line L=EQ, where E is the orthographic projection of the optical center C. Line L is projected on the second image as a line/'=e'q', where e' and q' are respectively the projection of E and Q. Thus, the point in the second image corresponding to p is constrained to lie on the line/', which is called the epipolar line of p. If another image point is considered in the first image, another line will be on the auxiliary plane, which also contains point E. Therefore, all epipolar lines in the second image pass through the common point e', which is the epipole for this example.

Referring to FIG. 7B, the epipolar geometry from weak perspective view to full perspective view is shown. For a given image point p' in the weak perspective image, Q is the intersection of the optical ray C'p' with the auxiliary plane. Any point on the line QN, which goes through Q and is parallel to the optical axis C'z', projects to p'. Therefore, the point in the first image corresponding to p' is constrained to lie on the projection of line. QN, denoted by l, the epipolar line of p'. Because CE is parallel to QN, E is on the plane defined by C, Q and N, the epipolar plane of p'. Thus, the epipolar line l goes through e, which is the intersection of CE with the image plane. If another point is considered in the second image, the epipolar plane contains line CE, and therefore, the epipolar line goes through point e, which is the epipole for this example.

FIG. 7A shows the epipolar line l' on the weak perspective image corresponding to a given point in the perspective image. The auxiliary plane is $[0, 0, 1]^T M'-w=0$ in the coordinate system of the second view, which is equivalent to $r_3^T M + t_3 - w = 0$ in the coordinate system of the first view, i.e., the normal vector of the plane is $r_3$. Point Q is given by Q=s$\tilde{p}$ and s is determined from $r_3^T Q + t_3 - w = 0$, that is $s=(w-t_3)/r_3^T \tilde{p}$. Point E is simply given by $E=(w-t_3)r_3$. The projective coordinates of their projection are, according to equation (2), given by:

$$\tilde{q}' = \begin{bmatrix} r_1^T \\ r_2^T \\ 0^T \end{bmatrix} \tilde{p} + \frac{1}{s}\tilde{w} \text{ and } \tilde{e}' = w$$

The epipolar line is then defined by $l'=\tilde{e}' \times \tilde{q}' = G\tilde{p}$. Requiring the matching point on the epipolar line gives $\tilde{p}'^T l'=0$, which is equivalent to equation (3).

FIG. 7B shows the epipolar line l on the perspective image. Point Q is given by $Q'=w\tilde{p}'$ in the coordinate system of the second view, so $Q=wR^T\tilde{p}'-R^T t$. In turn, the projective coordinates of q are given by $\tilde{q}=Q$ according to equation (1). As stated above, the normal vector of the auxiliary plane is equal to $r_3$, therefore, the projective coordinates of e are given by $\tilde{e}=r_3$. The epipolar line l is then defined by:

$$l=\tilde{q}\times\tilde{e}=-r_3 \times[r_1,r_2,r_3](w\tilde{p}'-t)=[-r_2,r_1,0](w\tilde{p}'-t)=G^T\tilde{p}'$$

Requiring the matching point on the epipolar line gives $\tilde{p}^T l=0$, i.e., $\tilde{p}G^T\tilde{p}'=0$, which is equivalent to equation (3).

Properties of the G Matrix

The G Matrix has a number of important properties. Namely, if $g_i$ is set equal to the $i^{th}$ row of G, from equation (4), it can be shown that the G Matrix exhibits orthogonality, normality and singularity. Specifically, with regard to orthogonality, the first two rows are orthogonal, i.e.:

$$g_1^T g_2 = 0 \quad (5)$$

Second, with regard to normality, the first two rows have an equal magnitude, i.e.:

$$g_1^T g_1 - g_2^T g_2 = 0 \quad (6)$$

Next, with regard to singularity, the last row is the linear combination of the first two rows, or equivalently, the rank of the G matrix is equal to 2, i.e.:

$$g_3^T(g_1 \times g_2) = 0 \quad (7)$$

It should be noted that the G matrix is not an essential matrix because G does not necessarily have two equal singular values. Indeed, the eigenvalues of $GG^T$ are: $0, \omega^2, t_1^2 + t_2^2 + \omega^2$. The first two constraints on G above, which are quadratic, are actually simpler than the constraint on an essential matrix, which is biquadratic.

Basic Example to Recover Motion:

As an example, if a G Matrix satisfies the above three constraints. (orthogonality, normality and singularity), motion parameters including the rotation between the views, such as a rotation matrix denoted by R (however, this can also be quaternion parameters, Euler angles, or the like), is extracted. Another motion parameter that is preferably extracted is a position vector denoted by w. The position vector is a 3D vector representing at least x and y scalar components of translation as well as the vantage view depth from the object or the distance between the auxiliary plane and the optical center of the weak perspective view or camera position.

Thus, from the following expression:

$$w=\|g_1\|=\|g_2\|, r_1=g_2/w, r_2=-g_1/w, r_3=r_1\times r_2, t_1=g_3^T r_2, \text{ and } t_2=-g_3^T r_1,$$

if the orthogonality, normality and singularity constraints are satisfied, the R and w parameters can be recovered as the motion parameters from the G Matrix. Once the R and w parameters are extracted, they can be refined and then used to recover and refine structure as discussed above in FIGS. 6 and 7.

Figure 8:
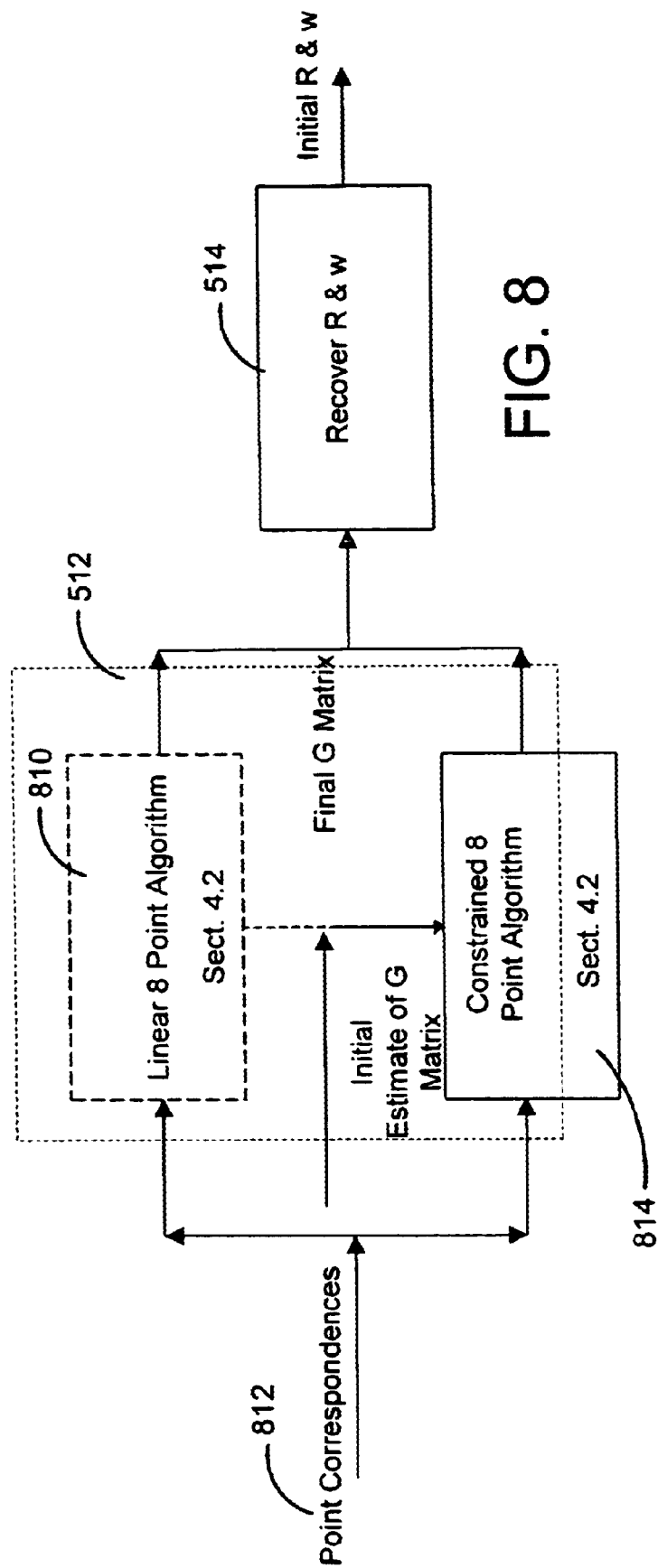
FIG. 8 is a flow/block diagram illustrating details for recovering motion parameters.
Figure 9:
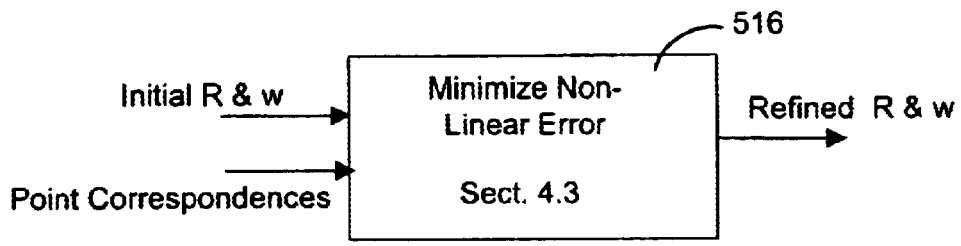
FIG. 9 is a flow/block diagram illustrating details for refining motion parameters.
Figure 10:
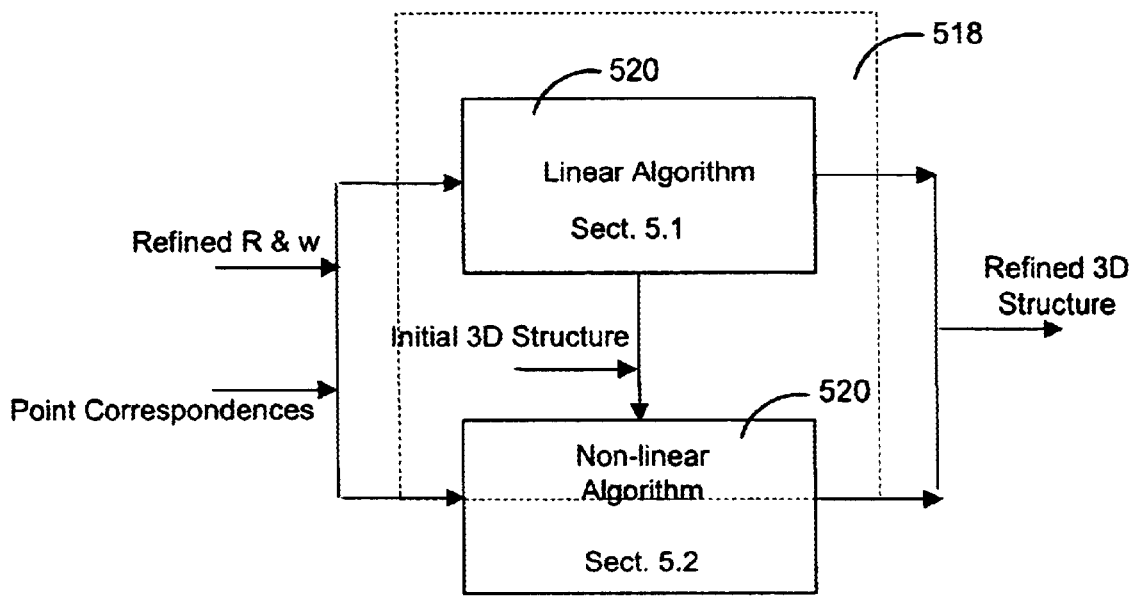
FIG. 10 is a flow/block diagram illustrating details for recovering structure parameters.
Figure 11:
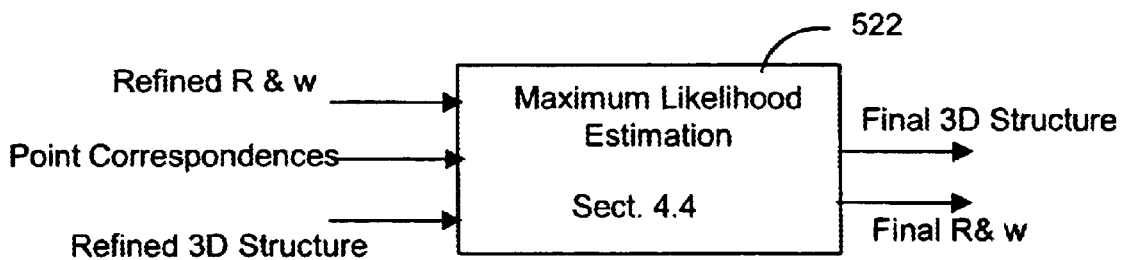
FIG. 11 is a flow/block diagram illustrating details for refining structure parameters.

Operational Details for Recovering Motion with Noisy Data:

Alternatively, the motion parameters can be robustly recovered when there is noisy data and if the above three constraints (orthogonality, normality and singularity) are not satisfied with the techniques described below. In general, referring to FIG. 5 along with FIG. 8, first an estimation module 810 (such as a standard linear eight-point computational module) of the motion processor 512 receives point correspondences 812 from the point matching processor 510. The estimation module 810 computes an initial estimate representing the epipolar geometry of the object (a fundamental matrix or G matrix) by minimizing errors or linearizing point correspondence data 812.

In particular, motion and structure can be recovered given point matches between the full perspective and weak perspective views. The parameter g is set equal to $[g_1^T, g_2^T, g_3^T]^T$ and equation (3) can be written in the following form:

$$a^T g 32\ 0 \text{ with } a=[x'\tilde{p}^T, y'\tilde{p}^T, \tilde{p}^T]^T \quad (8)$$

Given n point matches, there are n such equations. By stacking them in matrix form, the following is produced:

$$Ag=0 \quad (9)$$

where A is a n×9 matrix with each row given by vector a in equation (8). This equation, together with the three constraints described above (orthogonality, normality and singularity), provides a solution for g. Because there are 3 constraints on g and g is determined up to a scale factor, g can be solved by counting the number of unknowns and constraints, if there are 5 or more point matches in general position.

For example, when there are 5 point matches, through the (singular value decomposition) SVD of A, 4 right singular vectors are obtained, denoted by $v_i$ (i=1, ..., 4), associated with singular value 0. So, the solution is $g=\Sigma_{i=1}^{4}\lambda_i v_i$, where $\lambda_i$'s are defined up to a scale factor. Setting one of $\lambda_i$'s to 1, leaves three unknowns. However, from equations (5) to (7), there are two quadratic and one cubic equations in three unknowns. Thus, there are at most 12 solutions. Suitable mathematical examination and elimination can allow reduction of the number of solutions.

For 6 point matches, similarly, from the SVD of A, three right singular vectors can be obtained denoted by $v_i$ (i=1, ..., 3), associated with singular value 0. Thus, the solution is $g=\Sigma_{i=1}^{3}\lambda_i v_i$, where $\lambda_i$'s are defined up to a scale factor. Setting one of $\lambda_i$ to 1, leaves two unknowns. Using the constraints of equations (5) and (6), there are at most four real solutions, each of which can then be checked with equation (7). A unique solution can be expected. In the case of noisy data, the solution which best satisfies equation (7) is chosen, which in turn is used as an initial guess in a successive quadratic programming (SQP) technique by minimizing $\|Ag\|^2$ under all three constraints. Basically, the nonlinear constraints are linearized to transform the above into an equality constrained quadratic function minimization, which can be readily solved by transforming it, through QR factorization, into an unconstrained least-squares problem.

For 7 point matches, 2 right singular vectors are obtained, denoted by $v_i$ (i=1, 2), associated with singular value 0. The solution is $g=\lambda_1 v_1+\lambda_2 v_2$. Setting one of $\lambda_i$'s to 1, leaves only one unknown. Using equation (5), two solutions are obtained which can then be checked against equations (6) or (7). In the noisy case, it is preferred to solve all three equations, choose for each equation the solution which is closest to the solutions of other equations, and finally compute the average. The average is then used as an initial guess in a successive quadratic programming (SQP) techniques by minimizing $\|Ag\|^2$ under all three constraints. Once g is estimated, (R, w) can be estimated using the technique described below with the recover module 514.

Next, as an option, a secondary estimation module 814, such as a constrained eight-point computation module can be used to minimize an algebraic distance between an initial estimate of the G Matrix and an ideal representation of the G Matrix. The initial estimate of the G Matrix can be produced by the estimation module 810 or can be arbitrarily assigned as an initial guess. Unlike the linear eight-point module, which minimizes errors by ignoring constraints of the G matrix, the constrained eight-point method minimizes errors by using the constraints of the G matrix. It should be noted that the constrained eight-point method can be used instead of the linear eight-point method or it can be used in addition to enhance or improve the results of the linear eight-point method, as denoted by the dashed lines.

Specifically, if there are eight or more point matches, $\|Ag\|^2$ can be minimized under all three constraints. This can be done with the secondary estimation module preprogrammed with a successive quadratic programming (SQP) technique of the present invention. This technique is referred hereinafter as a constrained eight-point SQP. In contrast to a standard eight-point algorithm which ignores all the constraints, the constrained eight-point SQP of the present invention uses all the constraints. It should be noted that the constrained eight-point SQP of the present invention requires an initial guess, which can be assumed or obtained from the eight-point algorithm. One way to accomplish this is to compute the singular vector of A associated with the smallest singular value. Better results can be obtained through prior data normalization. Once g is estimated, (R, w) can be estimated using the technique described below with the recover module 514.

The recover module 514 recovers motion parameters from the G Matrix, such as Euclidean motion parameters, including the rotation parameter R, and the position vector w. Motion parameters from the G Matrix can be recovered by minimizing the Frobenius norm of the difference between the estimated G Matrix found above and a predicted or ideal G Matrix. In some situations, such as when the G Matrix is estimated from noisy data using the linear estimation module 810, the G Matrix does not satisfy the above three constraints. In these cases, a more robust technique can be used to recover the motion parameters.

Namely, first, the position vector w is estimated. Note that w is determined up to a scale factor. This is because multiplying w by an arbitrary nonzero scalar does not affect the validity of equation (3). From equation (4), $G^T w=0$, and the least-squares solution is well known to be the right singular vector of $G^T$ associated with the least singular value. In order to estimate R, as discussed above, the Frobenius norm of the difference between the estimated matrix and the predicted matrix is minimized. That is, $$\min_R \left\| G - [w]_x \begin{bmatrix} r_1^T \\ r_2^T \\ 0^T \end{bmatrix} \right\|^2 \text{ subject to } \begin{cases} R^T R = I \\ \det R = I \end{cases} \quad (10)$$

This is equivalent to minimizing $\|GR^T - B\|^2$, where:

$$B = [w]_x \begin{bmatrix} r_1^T \\ r_2^T \\ 0^T \end{bmatrix} \quad R^T = \begin{bmatrix} 0 & -w & 0 \\ w & 0 & 0 \\ -t_2 & t_1 & 0 \end{bmatrix}$$

By definition of matrix trace, $\|C\|^2 = tr(C^T C)$ for any matrix C. Because R is orthonormal:

$$\|GR^T - B\| = tr(G^T G) + tr(B^T B) - 2tr(RG^T B)$$

Therefore, equation (10) is equivalent to maximizing $tr(RG^T B)$. $USV^T$ is set to be the SVD of $G^T B$, where S=diag $(s_1, s_2, s_3)$ and $s_3 = 0$ because B is a singular matrix. If the orthogonal matrix Z is defined by $Z=V^T RU$, then $$tr(RG^T B) = tr(RUSV^T) = tr(ZS) = Z_{11}s_1 + Z_{22}s_2 \leq s_1 + s_2$$

The upper bound is attained when $Z_{11}=Z_{22}=1$. It follows that $Z_{33} \pm 1$ and $Z_{ij}=0$ for $i \neq j$. Finally, the rotation matrix is given by $R=VZU^T$, and there are two possibilities because of the sign of $Z_{33}$. One possibility can be eliminated because of the requirement det R=1.

Because G is determined up to a scale factor including its sign, another solution of R exists by solving:

$$\min_R \left\| -G - [w]_x \begin{bmatrix} r_1^T \\ r_2^T \\ 0^T \end{bmatrix} \right\|^2 \text{ subject to } \begin{cases} R^T R = I \\ \det R = 1 \end{cases} \quad (11)$$

The solution is given by $R=VZ'U^T$ where $Z'=\text{diag}(-Z_{11}, -Z_{22}, Z_{33})$.

The ambiguity in rotation has the same nature as the twisted pair of solutions in structure from motion from two perspective views. The correct solution can be ascertained by considering image points. For instance, for a pair of points (p, p'). From equations (1) and (2):

$$s' w \times \tilde{p}' = sG\tilde{p}$$

In order for (R,w) to be physically realizable for (p,p'), the reconstructed point should be at the same side of the cameras producing the full and weak perspective views, i.e., both s and s' should have the same sign. This yields the following:

$$(w \times \tilde{p}) \cdot (G\tilde{p}) > 0 \quad (12)$$

A solution that passes the above test is preferably chosen.

The sign of the translation is determined after 3D reconstruction, which will be discussed below in detail. If the depth is negative, the sign of the translation is reversed, and the 3D structure is simply $-M$.

Next, motion is refined with the motion refine module 516, such as a gradient weighted non-linear refinement module, to refine the estimate of the motion parameters using data produced by the point matching process. The gradient weighted non-linear refinement module preferably uses a weighted-least-squares technique to produce optimal values. Specifically, since the recover module 514 minimizes the algebraic distances where $f_i = \tilde{p}^T G \tilde{p}_i$, the variance of each $f_i$ is not the same, hence the above estimation is not optimal.

The refine module 516 is preferably a least-squares technique that produces an optimal solution if each term has the same variance, which leads to minimization of the following weighted sums of squares:

$$\min_{R,w} \sum_i f_i^2 / \sigma_{f_i}^2 \quad (13)$$

where $\sigma_{f_i}^2$ is the variance of $f_i$ (the computation of the variance is given below). The rotation R is parameterized by a vector of 3 parameters, denoted by r, which is parallel to the rotation axis and whose magnitude is equal to the rotation angle. R and r are related by the Rodrigues formula provided in *Three Dimensional Computer Vision: a Geometric Viewpoint*, MIT Press, 1993, by O. Faugeras.

The initial guess for this nonlinear minimization is obtained from the constrained 8-point algorithm described above. Assuming the image points are corrupted by independent and identically distributed (i.i.d.) Gaussian noise with variance $\rho^2$, the variance of $f_i$ is, under the first order approximation, given by:

$$\sigma_{f_i}^2 = \sigma^2 \left( \left\| \frac{\partial f_i}{\partial p_i} \right\|^2 + \left\| \frac{\partial f_i}{\partial p'_i} \right\|^2 \right) = \sigma^2 (l_1^2 + l_2^2 + l_1'^2 + l_2'^2)$$

where $l'_1 = [l'_1, l'_2, l'_3]^T = G\tilde{p}_i$ and $l_i \equiv [l_1, l_2, l_3]^T = G^T \tilde{p}'_i$. Since multiplying each term by a constant does not affect the minimization, $\sigma$ can simply be ignored.

The 3D structure (i.e., the position of each point) or scene can then recovered or reconstructed up to a global scale in Euclidean space defined in the first coordinate system based on the computation of (R, w) from the above steps with the structural processor 518. A recover module 520 using a linear method and/or a non-linear method can be used to reconstruct the 3D structure. The linear method computes 3D points with the data obtained from point matching by minimizing an algebraic distance.

Namely, from equation (1) and (2), given a point match (p, p'), the following vector equation is produced:

$$AM = b \text{ with } A = \begin{bmatrix} 1 & 0 & -u \\ 0 & 1 & -v \\ r_1^T/w & & \\ r_2^T/w & & \end{bmatrix} \text{ and } b = \begin{bmatrix} 0 \\ 0 \\ u' - t_1/w \\ v' - t_2/w \end{bmatrix}$$

The solution is $M = (A^T A)^{-1} A^T b$. The non-linear method computes 3D points by minimizing the image distances between the detected point and the predicted one (namely, the projection of the reconstructed point) in each image. In particular, if it is assumed that the noise in image points is independent and identically distributed (i.i.d.), the optimal solution is obtained by minimizing the distance between observation and reproduction of 3D reconstruction, i.e., $$\min_M \left[ \left(u - \frac{X}{Z}\right)^2 + \left(v - \frac{Y}{Z}\right)^2 + \left(u' - \frac{1}{w} r_1^T M - \frac{t_1}{w}\right)^2 + \left(v' - \frac{1}{w} r_2^T M - \frac{t_2}{w}\right)^2 \right]$$

The initial guess for this nonlinear minimization can be obtained with the above linear algorithm. Also, it should be noted that the non-linear method can be used instead of the linear method or it can be used in addition to enhance or improve the results of the linear method, as denoted by the dashed lines.

Last, using the point matching data and the results from the previous step, an additional refinement step is performed by the refine module 522. The last refinement step further enhances the data and reduces the 3D reconstruction error. One refinement technique includes determining a maximum likelihood estimation value and making appropriate adjustments based on the value. Specifically, if it is assumed that the noise in image points is i.i.d., the maximum likelihood estimation is equivalent to minimizing distances between the observation and reprojection of 3D reconstruction, i.e., $$\min_{R,w,\{M_i\}} \sum_i \left( \|p_i - \hat{p}_i\|^2 + \|p'_i - \hat{p}'_i\|^2 \right) \quad (14)$$

where $\hat{p}_i$ and $\hat{p}'_i$ are projections of $M_i$ in the first and second views according to equations (1) and (2). The rotation is parameterized by 3 parameters, as in the gradient-weighted technique described above. An initial guess of (R, w) is obtained using the technique described above. Initial estimation of the structure is obtained using the technique described above and with reference to the motion processor 512. Greater efficiency can be achieved either by exploiting the sparse property of the Jacobian matrix or by only considering 3D reconstruction in the inner loop of motion estimation.

Working Examples
Experiments with Computer Simulations

FIGS. 12A–12C are plot diagrams of a working example of a computer simulation illustrating relative errors. In this section, results are presented with noisy data simulated according to full and weak perspective projection for validation purposes. In this example, a camera with a field of view of 40 degrees is used. The image resolution is 640 pixels×640 pixels. The focal length is equal to 880 pixels. Thirty points are uniformly selected from a cube with sides equal to 100 cm. The cube is located at 500 cm from the camera. Two views are generated, one according to full perspective projection, the other according to weak perspective projection.

The motion between the two views is set to $r=[0,1, -0.2, 0]^T$ (in radian) or $[5.73, -11.46, 0]^T$ (in degrees), and $w=[-9.7, -9.85, 120]^T$ (in cm). The thirty image points in the full perspective view cover about 170×170 pixels, while they cover almost the whole image in the weak perspective view. Gaussian noise is added at different levels. For each noise level, 50 independent trials were conducted, and the average errors were computed.

For rotation, the difference of each individual element was computed between the estimated rotation vector and ground truth. The result is shown in FIG. 12A. The error for Gaussian noise with 1 pixel standard deviation is about 0.5 degrees, as shown in FIG. 12A. For vector w, the angle between the estimated one and the ground truth was computed because w is determined up to a scale factor. The result is shown in FIG. 12B. The error for 1 pixel of noise is less than 3 degrees, as shown in FIG. 12B. The errors in 3D reconstruction was also computed. Because the 3D reconstruction is defined up to a global scale and the ground truth is known, (s, R, t) can be computed such that $D=\Sigma_{i=1}^{N} \|sR\hat{M}_i+t-M_i\|^2$ is minimized, where $\hat{M}_i$ and $M_i$ are respectively the estimated 3D position vector and the ground truth of the $i^{th}$ point. Furthermore, $\sqrt{D/N}$ gives the mean 3D reconstruction error. FIG. 12C shows this error divided by the average depth (500 cm in this case). The relative error increases with the noise level, and reaches at 5% for 1 pixel of noise.

Experiment with Actual Data

This section provides experimental results with actual data. The experiment involves the following scenario where two images are taken by a camera at different distances from the object. FIG. 13A shows the image of a basketball taken by a camera from a very close range, while FIG. 13B shows the image taken quite far away. Twenty-three points were located in each image (these points can be automatically or manually located with any suitable method), which are displayed as white dots in FIG. 13A. The camera was calibrated by viewing a planar pattern from a few unknown orientations. The following results were produced by the system of the present invention: $r=[0.428, -0.222, -0.063]^T$ (in radians), $w=[0.093, 0.083, 0.992]^T$. From the results, it can be inferred that the two camera positions differ by a rotation of approximately 20 degrees around the horizontal axis (x-axis), a rotation of approximately 10 degrees around the vertical axis (y-axis), and a significant displacement in depth (z-axis).

Also, twenty-three points were reconstructed in 3D space. Two views of the 3D reconstruction, rendered with a graphical browser, are shown respectively in FIGS. 14A and 14B. The image shown in FIG. 13A is used as the texture image, because the resolution of FIG. 13A is too low for the basketball. However, if it is desired to display the global scene, the high resolution of the texture image for the basketball may not be necessary, or even should not be used because of inefficiency.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for performing multi-resolution modeling of a three-dimensional object comprising:
   obtaining full and weak perspective views of the object as two-dimensional images;
   digitally combining the images; and
   producing combination data defined by epipolar geometrical representations of the object and digitally reconstructing the object from the combination data.

2. The method of claim 1, wherein the full and weak perspective views are obtained as a proximal camera view modeled as the full perspective view of the object and a distant camera view approximated as the weak perspective view of the object.

3. The method of claim 2, further comprising producing three-dimensional position points and camera positions between the views from the combination data.

4. The method of claim 2, further comprising producing texture maps of the three dimensional object from the combination data.

5. A method for modeling a three-dimensional object comprising:
   obtaining a first view of the object from a first projection model as two-dimensional first image;
   obtaining a second view of the object from a second projection model different from the first projection model as two-dimensional second image;
   digitally combining the first and second images;
   producing epipolar geometrical representations of the images with a matrix defined by motion and structure parameters; and
   digitally reconstructing the object from the parameters of the matrix.

6. The method of claim 5, wherein obtaining the first view of the object includes obtaining a close camera field of view of the object and wherein obtaining the second view of the object includes obtaining a wide camera field of view of the object.

7. The method of claim 6, wherein the close camera field of view is approximated as a weak perspective view and the wide camera field of view is a full perspective view.

8. The method of claim 5, wherein obtaining the first view of the object includes obtaining a proximal view modeled as a full perspective view of the object and obtaining the second view of the object includes obtaining a distant view approximated as a weak perspective view of the object.

9. The method of claim 5, wherein obtaining the first view of the object includes obtaining a map orthophoto of object modeled as a weak-perspective view and obtaining the second view of the object includes obtaining a normal camera photograph modeled as a full perspective view.

10. A multi-resolution modeling system for digitally modeling three-dimensional objects comprising:
   a camera that obtains a first view of the object from a first projection model as a first two-dimensional image and a second view of the object from a second projection model different than the first projection model as a second two-dimensional image;
   a digital processor that combines the images and produces epipolar geometrical representations of the object with a matrix defined by motion and structure parameters; and a reconstruction processor that reconstructs the object from the parameters of the matrix.

11. The multi-resolution modeling system of claim 10, wherein the first view is obtained as a proximal camera view modeled as a full perspective view of the object and the second view is a distant camera view approximated as a weak perspective view of the object.

12. The multi-resolution modeling system of claim 10, wherein the reconstruction processor produces three-dimensional position points and camera positions between the views from the parameters.

13. The multi-resolution modeling system of claim 10, wherein the reconstruction processor produces texture maps of the three dimensional object from the parameters.

14. The multi-resolution modeling system of claim 10, wherein the first view is obtained as a close camera field of view of the object and the second view is obtained as a wide camera field of view of the object.

15. The multi-resolution modeling system of claim 14, wherein the close camera field of view is approximated as a weak perspective view and the wide camera field of view is a full perspective view.

16. The multi-resolution modeling system of claim 10, wherein the first view is obtained as a proximal view modeled as a full perspective view of the object and the second view is obtained as a distant view approximated as a weak perspective view of the object.

17. The multi-resolution modeling system of claim 10, wherein the first view is obtained as a map orthophoto of object modeled as a weak-perspective view and the second view is obtained as a normal camera photograph modeled as a full perspective view.

18. A computer-readable storage device encoded with a set of instructions for digitally modeling three-dimensional objects, the set of instructions comprising:

capturing multiple views of the object from differing projection models as two-dimensional images;

a digital processor that combines the images and produces epipolar geometrical representations of the object with a matrix defined by motion and structure parameters; and a reconstruction processor that reconstructs the object from the parameters of the matrix.

19. The set of instructions of claim 18, wherein capturing multiple views of the object includes capturing a close camera field of view of the object from a first projection model and capturing a wide camera field of view of the object from a second projection model different from the fist projection model.

20. The set of instructions of claim 19, wherein the close camera field of view is approximated as a weak perspective view and the wide camera field of view is a full perspective view.

21. The set of instructions of claim 18, wherein capturing multiple views of the object includes capturing a proximal view modeled as a full perspective view of the object from a first projection model and capturing a distant view approximated as a weak perspective view of the object from a second projection model different from the fist projection model.

22. The set of instructions of claim 18, wherein capturing multiple views of the object includes capturing a map orthophoto of object modeled as a weak-perspective view and capturing a normal camera photograph modeled as a full perspective view.

23. The set of instructions of claim 18, wherein the multiple views are captured as at least one proximal camera view modeled as a full perspective view of the object and at least one distant camera view approximated as a weak perspective view of the object.

24. The set of instructions of claim 18, further comprising producing three-dimensional position points-and camera positions between the multiple views from the parameters.

25. The set of instructions of claim 18, further comprising producing texture maps of the three dimensional object from the parameters.

* * * * *

UNITED STATES PATENT AND TRADEMARK OFFICE
CERTIFICATE OF CORRECTION

PATENT NO. : 6,661,913 B1
DATED : December 9, 2003
INVENTOR(S) : Zhang et al.

It is certified that error appears in the above-identified patent and that said Letters Patent is hereby corrected as shown below:

<u>Title page, Item [54] and Column 1, line 1,</u>
Title, "MULTIPLES" should be -- MULTIPLE --

<u>Column 7,</u>
Line 11, "detail-below" should be -- detail below --

<u>Column 9,</u>
Line 10, "line/'=e'q" should be -- line l'=e'q' --
Line 13, "line/'" should be -- line l' --

<u>Column 10,</u>
Line 62, equation should appear as follows:

$$a^T g = 0 \text{ with } a = \left[ x' \widetilde{p}^T, y' \widetilde{p}^T, \widetilde{p}^T \right]^T \qquad (8)$$

<u>Column 12,</u>
Line 52, equation should appear:

$$\left\| GR^T - B \right\|^2 = tr(G^T G) + tr(B^T B) - 2tr(RG^T B)$$

<u>Column 13,</u>
Line 22, equation should appear:

$$(w x \widetilde{p}) \bullet (G \widetilde{p}) \succ 0 \qquad (12)$$

Line 35, "distances where" should be -- distances $\sum_i f_i^2$, where --

UNITED STATES PATENT AND TRADEMARK OFFICE
CERTIFICATE OF CORRECTION

PATENT NO. : 6,661,913 B1
DATED : December 9, 2003
INVENTOR(S) : Zhang et al.

It is certified that error appears in the above-identified patent and that said Letters Patent is hereby corrected as shown below:

Column 13 (cont'd),
Line 58, "$\rho^2$" should be -- $\sigma^2$ --

Signed and Sealed this

Twenty-fourth Day of August, 2004

JON W. DUDAS
*Director of the United States Patent and Trademark Office*